(12) United States Patent
He (10) Patent No.: US 12,513,372 B2
(45) Date of Patent: Dec. 30, 2025

(54) AUDIO DATA PROCESSING METHOD, AUDIO DATA PROCESSING APPARATUS, COMPUTER READABLE STORAGE MEDIUM, AND ELECTRONIC DEVICE SUITABLE FOR STAGE

(71) Applicant: Jueqing He, Diamond Bar, CA (US)

(72) Inventor: Jueqing He, Diamond Bar, CA (US)

( * ) Notice: Subject to any disclaimer, the term of this patent is extended or adjusted under 35 U.S.C. 154(b) by 284 days.

(21) Appl. No.: 18/344,876

(22) Filed: Jun. 30, 2023

(65) Prior Publication Data

US 2024/0007707 A1   Jan. 4, 2024

(30) Foreign Application Priority Data

Jul. 1, 2022 (CN) .......................... 202210775583.X (51) Int. Cl.
*H04N 21/845* (2011.01)
*G06F 3/16* (2006.01)
*G11B 20/10* (2006.01)

(52) U.S. Cl.
CPC ......... *H04N 21/8456* (2013.01); *G06F 3/165* (2013.01); *G11B 20/10527* (2013.01); *G11B 2020/10638* (2013.01)

(58) Field of Classification Search
CPC ............. H04N 21/8456; H04N 21/439; H04N 21/4394; G06F 3/165; G11B 20/10527; G11B 2020/10638; H04L 47/625; H04L 49/90

See application file for complete search history.

(56) References Cited

FOREIGN PATENT DOCUMENTS

| CN | 105100338 A | 11/2015 |
| CN | 108737874 A | 11/2018 |
| CN | 108873987 A | 11/2018 |
| CN | 108965971 A | 12/2018 |
| CN | 109714634 A | 5/2019 |
| CN | 114512139 A | 5/2022 |
| WO | 2020024945 A1 | 2/2020 |

*Primary Examiner* — Vivian C Chin
*Assistant Examiner* — Annabelle Kang
(74) *Attorney, Agent, or Firm* — Zhigang Ma (57) ABSTRACT

An audio data processing method, an audio data processing apparatus, a computer readable storage medium, and an electronic device, which are suitable for a stage, are provided. The audio data processing method includes steps of obtaining audio data packets sent by wireless communication modules of the audio playing device, and extracting a first timestamp from audio data package names of the audio data packets; determining whether each of first package names corresponding to a preset primary cache queue includes the first timestamp; and inserting the audio data packets into the preset primary cache queue if each of the first package names corresponding to the preset primary cache queue does not include the first timestamp; taking an earliest value in the timestamps corresponding to each of the first package names corresponding to the preset primary cache queue as a second timestamp.

9 Claims, 3 Drawing Sheets

AUDIO DATA PROCESSING METHOD, AUDIO DATA PROCESSING APPARATUS, COMPUTER READABLE STORAGE MEDIUM, AND ELECTRONIC DEVICE SUITABLE FOR STAGE

TECHNICAL FIELD

The present disclosure relates to a technical field of audio data processing, and in particular to an audio data processing method, an audio data processing apparatus, a computer readable storage medium, and an electronic device, which are suitable for a stage.

BACKGROUND

With the increasingly richer technological elements in large-scale performance scenes, electronic devices and decorations for a stage become more and more. Sound equipment for the stage performs audio transmission through XLR cables, causing that there are many audio cables on the stage, moreover, distances between some of the sound equipment are relatively short and distances between some of the sound equipment are relatively long, thereby causing that wiring of the audio cables is complex. In order to solve such problem, wireless fidelity (WiFi), a wireless network connected by radio waves, is set in the sound equipment for the audio transmission, since there are many electronic devices and decorations on the stage, shielding and interference are caused, thereby affecting stability of transmission of the WiFi and quality of audio playing, and further affecting performance effect of the stage.

SUMMARY

Based on above, it is necessary to provide an audio data processing method, an audio data processing apparatus, a computer readable storage medium, and an electronic device, which are suitable for a stage and aim to solve technical problems that there are relatively more electronic devices and decorations on the stage causing shielding and interference, thereby affecting stability of wireless fidelity (WiFi) transmission and further affecting quality of audio playing.

The present disclosure provides an audio data processing method suitable for a stage, applied to an audio playing device, including:

obtaining audio data packets sent by wireless communication modules of the audio playing device, and extracting a first timestamp from audio data package names of the audio data packets;

determining whether each of first package names corresponding to a preset primary cache queue includes the first timestamp;

inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp;

taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time;

if the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal;

if the second timestamp is later than the latest extraction time, repeatedly taking the earliest value in the timestamps corresponding to each of the first package names corresponding to the preset primary cache queue as the second timestamp until obtaining the preset process stopping signal; and playing audio according to the preset playing queue.

Furthermore, the not inserting the audio data packets into the preset primary cache queue if each of the first package names corresponding to the preset primary cache queue includes the first timestamp includes:

not inserting the audio data packets into the preset primary cache queue if each of the first package names corresponding to the preset primary cache queue includes the first timestamp, and initializing a value of a preset counter to 1;

obtaining auxiliary cache queues each having a number corresponding to the value of the preset counter as queues to be analyzed;

determining whether each of second package names corresponding to the queues to be analyzed includes the first timestamp;

inserting the audio data packets into the queues to be analyzed if each of the second package names corresponding to the queues to be analyzed does not include the first timestamp, so as to sort each of the second package names corresponding to the queues to be analyzed in the ascending order according to the timestamps;

adding 1 to the value of the preset counter if each of the second package names corresponding to the queues to be analyzed includes the first timestamp, and repeatedly obtaining the auxiliary cache queues each having the number corresponding to the value of the preset counter as the queues to be analyzed until obtaining the preset process stopping signal;

the extracting the first audio data packet in the preset primary cache queue corresponding to the second timestamp and the performing the audio analysis on the first audio data packet include:

extracting the first audio data packet in the preset primary cache queue corresponding to the second timestamp as a first data packet; and confirming the audio data segment according to the first data packet and each of the auxiliary cache queues.

Furthermore, the confirming the audio data segment according to the first data packet and each of the auxiliary cache queues includes:

extracting a second audio data packet in each of the auxiliary cache queues corresponding to the second timestamp as a second data packet;

extracting a third audio data packet having highest channel priority from each of the first data packet and the second data packet in each of the auxiliary cache queues as a data packet to be analyzed according to a preset channel priority configuration; and performing the audio analysis on the data packet to be analyzed to obtain the audio data segment.

Furthermore, the confirming the audio data segment according to the first data packet and each of the auxiliary cache queues further includes:

performing the audio analysis on the first data packet to obtain a first data segment;

inputting the first data segment into a preset audio quality evaluation model for quality evaluation and calculation to serve as a first quality evaluation result;

determining whether the first quality evaluation result is within a preset quality evaluation range;

if the first quality evaluation result is within the preset quality evaluation range, taking the first data segment as the audio data segment;

if the first quality evaluation result is not within the preset quality evaluation range, extracting a fourth audio data packet in each of the auxiliary cache queues corresponding to the second timestamp as a third data packet;

performing the audio analysis on the third data packet to obtain a second data segment;

inputting the second data segment into the preset audio quality evaluation model for quality evaluation and calculation to serve as a second quality evaluation result;

extracting a quality evaluation result having highest quality from the first quality evaluation result and the second quality evaluation result as a target quality evaluation result; and performing the audio analysis on a fifth audio data packet corresponding to the target quality evaluation result to obtain the audio data segment.

Furthermore, the performing the audio analysis on the first data packet to obtain the first data segment includes:

subtracting the second timestamp from the current time as a duration to be analyzed;

determining whether the duration to be analyzed is less than a preset duration threshold;

if the duration to be analyzed is less than the preset duration threshold, performing the audio analysis on the first data packet to obtain the first data segment; and if the duration to be analyzed is not less than the preset duration threshold, performing the audio analysis on the first data packet to obtain the audio data segment.

Furthermore, before the obtaining the audio data packets sent by the wireless communication modules of the audio playing device, the audio data processing method suitable for the stage includes:

obtaining a device correction time and a time auxiliary list sent by a master console;

updating a local clock of the audio playing device according to the device correction time;

obtaining each of time points corresponding to a preset time window from the time auxiliary list based on a preset interval duration as a time point set;

setting nodes of the preset primary cache queue according to the time point set, where each of the nodes is configured to store one of the audio data packets;

the inserting the audio data packets into the preset primary cache queue includes:

inserting each of the audio data packets into each of first nodes in the nodes of the preset primary cache queue corresponding to the first timestamp;

the extracting the first audio data packet in the preset primary cache queue corresponding to the second timestamp and the performing the audio analysis on the first audio data packet to obtain the audio data segment includes:

performing the audio analysis on the first audio data packet in second nodes in the nodes of the preset primary cache queue corresponding to the second time stamp to obtain the audio data segment; and deleting the second nodes in the nodes of the preset primary cache queue corresponding to the second timestamp.

Furthermore, the obtaining the audio data packets sent by the wireless communication modules of the audio playing device includes:

if a communication type of each of the wireless communication modules is not WiFi, obtaining the audio data packets sent by a preset audio output device through the wireless communication modules;

if the communication type of each of the wireless communication modules is the WiFi, obtaining the audio data packets sent by a preset transit device through the wireless communication modules;

the preset transit device is located above the stage, and the preset transit device is configured to obtain the audio data packets sent by the preset audio output device; and the audio output device is configured to obtain the device correction time and the time auxiliary list sent by the master console, update a local clock of the audio playing device according to the device correction time, and perform data packet packaging on preset target audio data according to the time auxiliary list to obtain the audio data packets.

The present disclosure further provides an audio data processing apparatus suitable for a stage, applied to an audio playing device, including a data obtaining module, a first determination module, a cache module, a second determination module, a first processing module, a second processing module, and an audio playing module. The data obtaining module is configured to obtain audio data packets sent by wireless communication modules of the audio playing device, and extract a first timestamp from audio data package names of the audio data packets. The first determination module is configured to determine whether each of first package names corresponding to a preset primary cache queue includes the first timestamp. The cache module is configured to insert the audio data packets into the preset primary cache queue if each of the first package names corresponding to the preset primary cache queue does not include the first timestamp, so as to sort each of the first package names corresponding to the preset primary cache queue in an ascending order according to timestamps, and the cache module is further configured to not insert the audio data packets into the preset primary cache queue if each of the first package names corresponding to the preset primary cache queue includes the first timestamp. The second determination module is configured to take an earliest value in the timestamps corresponding to each of the first package names corresponding to the preset primary cache queue as a second timestamp, subtract a preset delay extraction duration from current time to obtain a latest extraction time, and determine whether the second timestamp is later than the latest extraction time. The first processing module is configured to, if the second timestamp is not later than the latest extraction time, extract a first audio data packet in the preset primary cache queue corresponding to the second timestamp, perform audio analysis on the first audio data packet to obtain an audio data segment, insert the audio data segment into a preset playing queue, and repeatedly take the earliest value in the timestamps corresponding to each of the first package names corresponding to the preset primary cache queue as the second timestamp until obtaining a preset process stopping signal. The second processing module is configured to, if the second timestamp is later than the latest extraction time, repeatedly take the earliest value in the timestamps corresponding to each of the first package names corresponding to the preset primary cache queue as the second timestamp until obtaining the preset process stopping signal. The audio playing module is configured to play audio according to the preset playing queue.

The present disclosure further provides an electronic device, including a memory and a processor. The memory stores a computer program, and the computer program is executed by the processor, causing the processor to execute following steps:

- obtaining audio data packets sent by wireless communication modules of the audio playing device, and extracting a first timestamp from audio data package names of the audio data packets;
- determining whether each of first package names corresponding to a preset primary cache queue includes the first timestamp;
- inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp;
- taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time;
- if the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal;
- if the second timestamp is later than the latest extraction time, repeatedly taking the earliest value in the timestamps corresponding to each of the first package names corresponding to the preset primary cache queue as the second timestamp until obtaining the preset process stopping signal; and playing audio according to the preset playing queue.

The present disclosure further provides a computer readable storage medium having stored therein a computer program to be executed by a processor, causing the processor to execute following steps:

- obtaining audio data packets sent by wireless communication modules of the audio playing device, and extracting a first timestamp from audio data package names of the audio data packets;
- determining whether each of first package names corresponding to a preset primary cache queue includes the first timestamp;
- inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp;
- taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time;
- if the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal;
- if the second timestamp is later than the latest extraction time, repeatedly taking the earliest value in the timestamps corresponding to each of the first package names corresponding to the preset primary cache queue as the second timestamp until obtaining the preset process stopping signal; and playing audio according to the preset playing queue.

According to the audio data processing method suitable for the stage of the present disclosure, the audio data packets sent by wireless communication modules of the audio playing device are obtained to achieve audio transmission using a plurality of wireless communication channels. Whether each of the first package names corresponding to the preset primary cache queue includes the first timestamp is determined, and the audio data packets are inserted into the preset primary cache queue if each of the first package names corresponding to the preset primary cache queue does not include the first timestamp, so as to sort each of the first package names corresponding to the preset primary cache queue in the ascending order according to the timestamps, and the audio data packets are not inserted into the preset primary cache queue if each of the first package names corresponding to the preset primary cache queue includes the first timestamp, thereby inserting a first arrived audio data packet of a plurality of the wireless communication modules into the preset primary cache queue, which combines transmission advantages of the plurality of the wireless communication modules, improves timeliness and stability of audio transmission, further reserves time for subsequent audio processing and playing, and improves audio playing quality. If the second timestamp is not later than the latest extraction time, the first audio data packet is extracted from the preset primary cache queue corresponding to the second timestamp to be performed with the audio analysis to obtain the audio data segment, and the audio data segment is inserted into the preset playing queue. By comparing the second timestamp with the latest extraction time, lack of audio data packets in partial timestamps is avoided as much as possible, thereby improving the audio playing quality. Moreover, the audio is played according to the preset playing queue, which improves fluency of audio playing and performance effect of the stage.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the accompanying drawings in the following description are merely some embodiments of the present disclosure, and those who skilled in the art may obtain other drawings according to these drawings without involving any inventive effort.

DETAILED DESCRIPTION

Technical solutions in embodiments of the present disclosure are clearly and completely described below with reference to accompanying drawings in the embodiments of the present disclosure. All other embodiments obtained by those who skilled in the art based on the embodiments of the present disclosure without creative efforts shall fall within protection scopes of the present disclosure.

Figure 1:
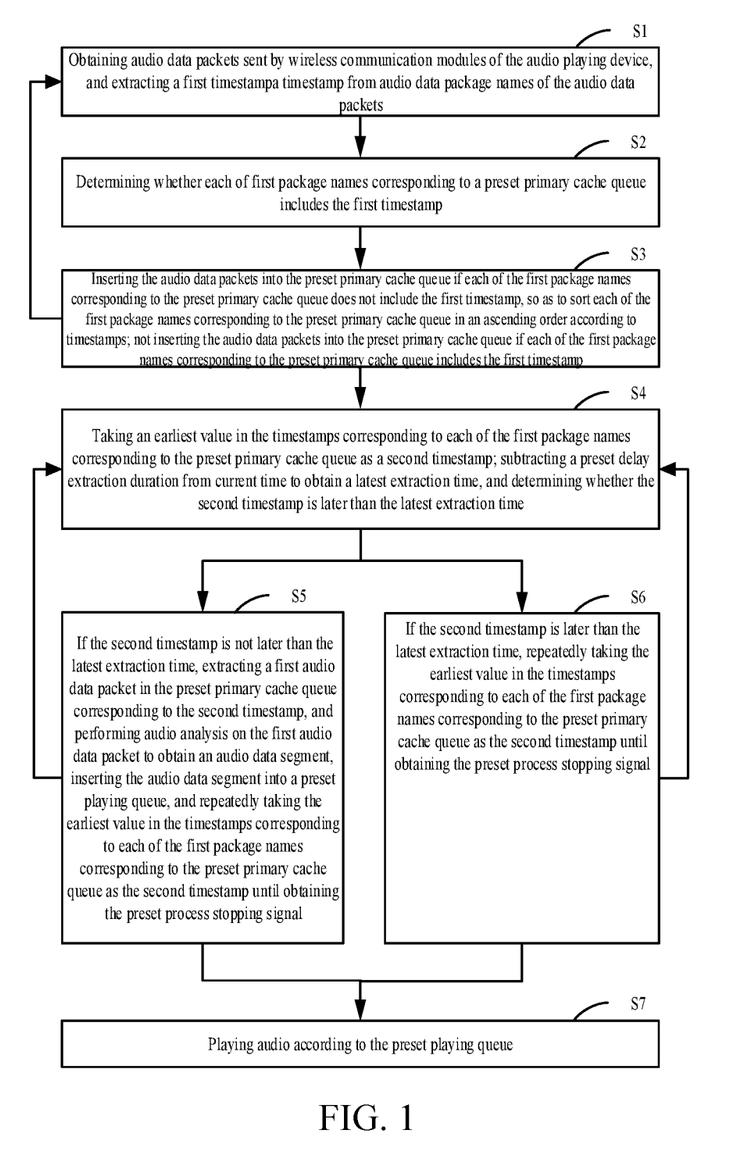
FIG. 1 is a context diagram of an audio data processing method suitable for a stage according to one embodiment of the present disclosure.

As shown in FIG. 1, in one embodiment, the present disclosure provides an audio data processing method suitable for a stage, applied to a terminal, and the terminal is applied to an audio playing device of the stage. The audio data processing method suitable for the stage specifically includes following steps.

Step S1: obtaining audio data packets sent by wireless communication modules of the audio playing device, and extracting a first timestamp from audio data package names of the audio data packets.

Specifically, the audio data packets sent by an audio output device are obtained based on a wireless communication connection between the wireless communication modules and the audio output device, the first timestamp is extracted from the audio data package names of the audio data packets obtained this time.

The audio data packets are data packets containing audio clips, and the audio data package names of the audio data packets include timestamps.

The audio output device is an audio source device.

It should be understood that since the same audio clip is transmitted by using a plurality of the wireless communication modules, the audio clips are required to be packaged in a multiple data packet packaging mode, and the timestamps in each of the packet names corresponding to each of the audio data packets packaged by the same audio clip are the same.

The wireless communication module in the step S1 is a wireless communication module in the audio playing device of the stage. The wireless communication module is a channel for wireless communication by using a wireless technology. A selection range of the wireless technology includes, but is not limited to, wireless fidelity (WiFi), ZigBee (wireless network protocol for low-speed short-distance transmission) technology, and Bluetooth technology.

Step S2: determining whether each of first package names corresponding to a preset primary cache queue includes the first timestamp.

Specifically, whether each of the timestamps corresponding to each of the first package names corresponding to the preset primary cache queue includes the first timestamp is determined.

Optionally, the preset primary cache queue is a queue capable of being inserted with elements at any position.

Step S3: inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp.

Specifically, if each of the first package names corresponding to the preset primary cache queue does not include the first timestamp, that is, the preset primary cache queue does not include a sixth audio data packet corresponding to the first timestamp, therefore, the audio data packets obtained this time are inserted into the preset primary cache queue, after inserting, each of the first package names corresponding to the preset primary cache queue is sorted in the ascending order according to the timestamps; if each of the first package names corresponding to the preset primary cache queue includes the first timestamp, that is, the sixth audio data packet corresponding to the first timestamp is already stored in the preset primary cache queue, and the audio data packets obtained this time are not required to be inserted into the preset primary cache queue, therefore, the audio data packets obtained this time are not inserted into the preset primary cache queue. Therefore, a first arrived audio data packet of each of the timestamps is always saved in the preset primary cache queue, which combines transmission advantages of the plurality of the wireless communication modules, improves timeliness and stability of audio transmission, further reserves time for subsequent audio processing and playing, and improves audio playing quality.

It should be understood that the step S1 to the step S3 are circularly executed until obtaining a preset process stopping signal.

The preset process stopping signal is a signal for stopping playing audio. The stop processing signal may be input by a user, or may be sent by a third-party application system, or may also be actively generated by a program executing the present disclosure according to a preset condition.

Step S4: taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time.

Specifically, an earliest value in the timestamps corresponding to each of the first package names corresponding to the preset primary cache queue is taken as a second timestamp, thereby finding an earliest timestamp not yet been analyzed. A preset delay extraction duration is subtracted from current time, and a time obtained after subtracting is taken as the latest extraction time, the determining whether the second timestamp is later than the latest extraction time is to determine whether a first audio data packet corresponding to the second timestamp satisfies a time analyzing condition, thereby providing a preset time condition for waiting the obtaining and the caching of the audio data packets, and further avoiding lack of audio data packets in partial timestamps as much as possible.

Step S5: if the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining the preset process stopping signal.

Specifically, if the second timestamp is not later than the latest extraction time, that is, the first audio data packet corresponding to the second timestamp satisfies the time analyzing condition, thereby extracting the first audio data packet in the preset primary cache queue corresponding to the second timestamp, and performing the audio analysis on the first audio data packet, and data obtained after the audio analysis is taken as the audio data segment. The audio data segment is inserted into a tail portion of the preset playing queue, and providing a basis for audio playing based on the preset playing queue. The taking the earliest value in the timestamps corresponding to each of the first package names corresponding to the preset primary cache queue as the second timestamp is repeatedly executed, that is, the step S4 to the step S5 are repeatedly executed until obtaining the preset process stopping signal. When obtaining the preset process stopping signal, the audio playing is stopped, and the step S4 to the step S5 are stopped to be repeatedly executed at this time.

Step S6: if the second timestamp is later than the latest extraction time, repeatedly taking the earliest value in the timestamps corresponding to each of the first package names corresponding to the preset primary cache queue as the second timestamp until obtaining the preset process stopping signal.

Specifically, if the second timestamp is later than the latest extraction time, that is, the first audio data packet corresponding to the second timestamp does not satisfy the time analyzing condition, thereby repeatedly taking the earliest value in the timestamps corresponding to each of the first package names corresponding to the preset primary cache queue as the second timestamp, that is, the step S4 to the step S6 are repeatedly executed until obtaining the preset process stopping signal. When obtaining the preset process stopping signal, the audio playing is stopped, and the step S4 to the step S6 are stopped to be repeatedly executed at this time.

Step S7: playing audio according to the preset playing queue.

Specifically, the audio data segment is obtained from a head portion of the preset playing queue for audio playing.

It may be understood that the loop execution in the step S1 to the step S3, the loop execution in the step S4 to the step S6, and the execution of the step S7 may be performed simultaneously and continuously.

According to the audio data processing method suitable for the stage of the present disclosure, the audio data packets sent by wireless communication modules of the audio playing device are obtained to achieve audio transmission using a plurality of wireless communication channels. Whether each of the first package names corresponding to the preset primary cache queue includes the first timestamp is determined, and the audio data packets are inserted into the preset primary cache queue if each of the first package names corresponding to the preset primary cache queue does not include the first timestamp, so as to sort each of the first package names corresponding to the preset primary cache queue in the ascending order according to the timestamps, and the audio data packets are not inserted into the preset primary cache queue if each of the first package names corresponding to the preset primary cache queue includes the first timestamp, thereby inserting the first arrived audio data packet of a plurality of the wireless communication modules into the preset primary cache queue, which combines transmission advantages of the plurality of the wireless communication modules, improves timeliness and stability of audio transmission, further reserves time for subsequent audio processing and playing, and improves audio playing quality. If the second timestamp is not later than the latest extraction time, the first audio data packet is extracted from the preset primary cache queue corresponding to the second timestamp to be performed with the audio analysis to obtain the audio data segment, and the audio data segment is inserted into the preset playing queue. By comparing the second timestamp with the latest extraction time, the lack of the audio data packets in the partial timestamps is avoided as much as possible, thereby improving the audio playing quality. Moreover, the audio is played according to the preset playing queue, which improves fluency of audio playing and performance effect of the stage.

In one embodiment, the not inserting the audio data packets into the preset primary cache queue if each of the first package names corresponding to the preset primary cache queue includes the first timestamp includes following steps.

Step S33: not inserting the audio data packets into the preset primary cache queue if each of the first package names corresponding to the preset primary cache queue includes the first timestamp, and initializing a value of a preset counter to 1.

Specifically, if each of the first package names corresponding to the preset primary cache queue includes the first timestamp, that is, the sixth audio data packet corresponding to the first timestamp is already stored in the preset primary cache queue, and the audio data packets obtained this time are not required to be inserted into the preset primary cache queue, therefore, the audio data packets obtained this time are not inserted into the preset primary cache queue. Moreover, a value of a preset counter is initialized to 1, which provides a basis for inserting the audio data packets obtained this time into auxiliary cache queues.

Step S312: obtaining the auxiliary cache queues each having a number corresponding to the value of the preset counter as queues to be analyzed.

Specifically, the auxiliary cache queues each having a number corresponding to the value of the preset counter is obtained as queues to be analyzed.

The auxiliary cache queues are queues capable of being inserted with elements at any position.

A plurality of the auxiliary cache queues are provided, and each of the plurality of the auxiliary cache queues has a unique number.

Step S313: determining whether each of second package names corresponding to the queues to be analyzed includes the first timestamp.

Specifically, whether each of the timestamps corresponding to each of the second package names corresponding to the queues to be analyzed includes the first timestamp is determined.

Step S314: inserting the audio data packets into the queues to be analyzed if each of the second package names corresponding to the queues to be analyzed does not include the first timestamp, so as to sort each of the second package names corresponding to the queues to be analyzed in the ascending order according to the timestamps.

Specifically, if each of the second package names corresponding to the queues to be analyzed does not include the first timestamp, that is, the sixth audio data packet corresponding to the first timestamp is not cached in the queues to be analyzed, therefore, the audio data packets obtained this time are inserted into the queues to be analyzed, after inserting, each of the second package names corresponding to the queues to be analyzed is sorted in the ascending order according to the timestamps.

Step S315: adding 1 to the value of the preset counter if each of the second package names corresponding to the queues to be analyzed includes the first timestamp, and repeatedly obtaining the auxiliary cache queues each having the number corresponding to the value of the preset counter as the queues to be analyzed until obtaining the preset process stopping signal.

Specifically, if each of the second package names corresponding to the queues to be analyzed includes the first timestamp, that is, the sixth audio data packet corresponding to the first timestamp is already stored in the queues to be analyzed, and the audio data packets obtained this time are not required to be inserted into the queues to be analyzed, therefore, the 1 is added to the value of the preset counter, which provides a basis for finding a next auxiliary cache queue as a queue to be analyzed. The obtaining the auxiliary cache queues each having the number corresponding to the value of the preset counter as the queues to be analyzed is repeatedly executed, that is, the step S312 to the step S315 are repeatedly executed until obtaining the process stopping signal. When obtaining the preset process stopping signal, and the step S312 to the step S315 are stopped to be repeatedly executed.

The extracting the first audio data packet in the preset primary cache queue corresponding to the second timestamp and the performing the audio analysis on the first audio data packet include following steps.

Step S511: extracting the first audio data packet in the preset primary cache queue corresponding to the second timestamp as a first data packet.

Specifically, the first audio data packet corresponding to the second timestamp is extracted from the preset primary cache queue, and the extracted first audio data packet is taken as the first data packet.

Step S512: confirming the audio data segment according to the first data packet and each of the auxiliary cache queues.

Specifically, the audio data segment is confirmed according to the first data and a fourth audio data packet in each of the auxiliary cache queues corresponding to the second timestamp.

In the embodiment, the sixth audio data packet corresponding to the first timestamp is cached in the preset primary cache queue, and the sixth audio data packet is stored in each of the auxiliary cache queues, so that redundant audio data packets is cached through the auxiliary cache queues in a case that the first arrived audio data packet is cached by the preset primary cache queue, which provides a basis for determining a better audio data segment in combination with the preset primary cache queue and the auxiliary cache queues.

In one embodiment, the confirming the audio data segment according to the first data packet and each of the auxiliary cache queues includes following steps.

Step S521: extracting a second audio data packet in each of the auxiliary cache queues corresponding to the second timestamp as a second data packet.

Specifically, the second audio data packet is extracted from each of the auxiliary cache queues corresponding to the second timestamp, and the obtained second audio data packet is taken as the second data packet.

Step S522: extracting a third audio data packet having highest channel priority from each of the first data packet and the second data packet in each of the auxiliary cache queues as a data packet to be analyzed according to a preset channel priority configuration.

Specifically, the first audio data packet and the second audio data packet in each of the auxiliary cache queues are taken as a data packet set, the third audio data packet having the highest channel priority is extracted from each of the first data packet and the second data packet in each of the auxiliary cache queues, and the obtained third audio data packet is taken as the data packet to be analyzed, so as to take the third audio data packet having the highest channel priority in each of the first data packet and the second data packet in each of the auxiliary cache queues as the data packet to be analyzed.

The channel priority refers to priority of a wireless channel corresponding to each of the wireless communication modules.

The preset channel priority configuration includes a channel priority identifier and a wireless channel identifier corresponding to each of the wireless communication modules. The wireless channel identifier corresponding to each of the wireless communication modules may be a name of the wireless channel corresponding to each of the wireless communication modules, or may be an ID of the wireless channel corresponding to each of the wireless communication modules for uniquely identifying the wireless channel corresponding to each of the wireless communication modules.

Furthermore, each of the audio data package names of the audio data packets carries an identifier of the wireless channel corresponding to each of the wireless communication modules.

Step S523: performing the audio analysis on the data packet to be analyzed to obtain the audio data segment.

Specifically, the data packet to be analyzed is performed with the audio analysis, and data obtained by the audio analysis is taken as the audio data segment.

Since packet packaging quality and transmission quality of different wireless technologies are different, in the embodiment, the third audio data packet having the highest channel priority is extracted from each of the first packet and the data packet as the data packet to be analyzed, which is beneficial to using the third audio data packet having the highest channel priority as the data packet to be analyzed, thereby further improving the quality of audio playing.

In one embodiment, the confirming the audio data segment according to the first data packet and each of the auxiliary cache queues further includes following steps.

Step S5231: performing the audio analysis on the first data packet to obtain a first data segment.

Specifically, the first data packet is performed with the audio analysis, and data obtained after the audio analysis is taken as the first data segment.

Step S5232: inputting the first data segment into a preset audio quality evaluation model for quality evaluation and calculation to serve as a first quality evaluation result.

Specifically, the first data segment is input into the preset audio quality evaluation model for quality evaluation and calculation, and a quality evaluation result obtained after calculation is taken as the first quality evaluation result.

The first quality evaluation result may be a score, or may be a level.

The preset audio quality evaluation model is also referred to as an audio quality appraisal model, and is configured to evaluate audio quality. The audio quality evaluation model is a model obtained based on neural network training.

Step S5233: determining whether the first quality evaluation result is within a preset quality evaluation range.

Step S5234: if the first quality evaluation result is within the preset quality evaluation range, taking the first data segment as the audio data segment.

Specifically, if the first quality evaluation result is within the preset quality evaluation range, that is, quality of the first data segment meets requirements, and therefore, the first data segment is taken as the audio data segment.

Step S5235: if the first quality evaluation result is not within the preset quality evaluation range, extracting a fourth audio data packet in each of the auxiliary cache queues corresponding to the second timestamp as a third data packet.

Specifically, if the first quality evaluation result is not within the preset quality evaluation range, that is, the quality of the first data segment does not meet the requirements, and therefore, the fourth audio data packet is extracted from each of the auxiliary cache queues corresponding to the second timestamp, and the obtained fourth audio data packet is taken as the third data packet.

Step S5236: performing the audio analysis on the third data packet to obtain a second data segment.

Specifically, the third data packet is performed with the audio analysis, and data obtained after the audio analysis is taken as the second data segment.

Step S5237: inputting the second data segment into the preset audio quality evaluation model for quality evaluation and calculation to serve as a second quality evaluation result.

Specifically, the second data segment is input into the preset audio quality evaluation model for quality evaluation and calculation, and a quality evaluation model after calculation is taken as the second quality evaluation result.

The second quality evaluation result may be a score, or may be a level.

Step S5238: extracting a quality evaluation result having highest quality from the first quality evaluation result and the second quality evaluation result as a target quality evaluation result.

Specifically, the quality evaluation result having the highest quality is extracted from the first quality evaluation result and the second quality evaluation result, and the extracted quality evaluation result having the highest quality is taken as the target quality evaluation result.

It should be understood that the first quality evaluation result and the second quality evaluation result may both be scores, or may both be levels.

Step S5239: performing the audio analysis on a fifth audio data packet corresponding to the target quality evaluation result to obtain the audio data segment.

Specifically, the fifth audio data packet corresponding to the target quality evaluation result is a cached audio data packet having the best quality of the second timestamp. Therefore, the fifth audio data packet corresponding to the target quality evaluation result is performed with the audio analysis, and data obtained after audio analysis is taken as the audio data segment.

In the embodiment, when the quality of the first data segment obtained by analyzing the first data packet meets the requirements, the first data segment is directly configured as the audio data segment, thereby improving an analyzing speed while ensuring the quality of the audio data segment; when the quality of the first data segment obtained by analyzing the first data packet does not meet the requirements, data analyzed from the cached audio data packet having the best quality of the second timestamp is configured as the audio data segment, thereby improving the quality of the audio data segment as much as possible.

In the embodiment, the performing the audio analysis on the first data packet to obtain the first data segment includes following steps.

Step S52311: subtracting the second timestamp from the current time as a duration to be analyzed.

Specifically, the second timestamp is subtracted from the current time, and data obtained after subtracting is taken as the duration to be analyzed.

Step S52312: determining whether the duration to be analyzed is less than a preset duration threshold.

Specifically, the preset duration threshold is a value greater than 0.

Step S52313: if the duration to be analyzed is less than the preset duration threshold, performing the audio analysis on the first data packet to obtain the first data segment.

Specifically, if the duration to be analyzed is less than the preset duration threshold, that is, the duration is not sufficient, therefore, the first data packet is performed with the audio analysis to obtain the first data threshold, which provides basis for confirming the audio data segment based on quality evaluation.

Step S52314: if the duration to be analyzed is not less than the preset duration threshold, performing the audio analysis on the first data packet to obtain the audio data segment.

Specifically, if the duration to be analyzed is not less than the preset duration threshold, that is the duration to be analyzed is greater than or equal to the preset duration threshold, at this time, the duration is not sufficient, and confirming the audio data segment based on the quality evaluation may affect fluency of audio playing. Therefore, the first data packet is performed with the audio analysis, and data obtained after the audio analysis is directly taken as the audio data segment.

In the embodiment, after the duration to be analyzed is less than the preset duration threshold, the first data packet is performed with the audio analysis to obtain the first data segment, which provides a basis for confirming the audio data segment based on the quality evaluation without affecting the fluency of audio playing, thereby improving audio playing quality; when the duration to be analyzed is greater than or equal to the preset duration threshold, the first data packet is performed with the audio analysis to obtain the audio data segment, which confirms the data segment without basis of the quality evaluation and further improving the fluency of audio playing.

In the embodiment, before the obtaining the audio data packets sent by the wireless communication modules of the audio playing device, the audio data processing method suitable for the stage includes following steps:

Step S111: obtaining a device correction time and a time auxiliary list sent by a master console.

Specifically, the device correction time and the time auxiliary list sent by the master console are obtained based on a communication connection between equipment on the stage and the master console.

The master console is a central console for controlling all equipment on the stage.

The time auxiliary list includes a plurality of the timestamps.

Step S112: updating a local clock of the audio playing device according to the device correction time.

Specifically, synchronizing the local clock of the audio playing device with the device correction time, thereby keeping the local clock of the audio playing device consistent with the master console, and further providing a basis for subsequent audio playing based on a unified timestamp.

Step S113: obtaining each of time points corresponding to a preset time window from the time auxiliary list based on a preset interval duration as a time point set.

Specifically, each of the time points corresponding to the preset time window is obtained from the time auxiliary list based on the preset interval duration, that is, each of the time points is obtained from the time auxiliary list every interval of the preset interval duration, and a maximum time span of each obtained time point is the same as a length of the preset time window.

Step S114: setting nodes of the preset primary cache queue according to the time point set, where each of the nodes is configured to store one of the audio data packets.

Specifically, in the preset primary cache queue, each of the nodes is set for each time point of the time point set, thereby providing a basis for rapidly inserting the audio data packets.

Furthermore, the nodes of the preset primary cache queue are sorted in the ascending order according to the timestamps.

The inserting the audio data packets into the preset primary cache queue includes following steps.

Step S321: inserting each of the audio data packets into each of first nodes in the nodes of the preset primary cache queue corresponding to the first timestamp.

Specifically, each of the audio data packets is inserted into each of first nodes in the nodes of the preset primary cache queue corresponding to the first timestamp, which rapidly inserts the audio data packets and further improves a speed of audio processing. The extracting the first audio data packet in the preset primary cache queue corresponding to the second timestamp and the performing the audio analysis on the first audio data packet to obtain the audio data segment includes following steps.

Step S531: performing the audio analysis on the first audio data packet in second nodes in the nodes of the preset primary cache queue corresponding to the second timestamp to obtain the audio data segment.

Specifically, the first audio data packet in second nodes in the nodes of the preset primary cache queue corresponding to the second timestamp is performed with the audio analysis, thereby rapidly extracting the first audio data packets in the preset primary cache queue to perform the audio analysis, which further improves the speed of audio processing.

Step S532: deleting the second nodes in the nodes of the preset primary cache queue corresponding to the second timestamp.

Specifically, the second nodes in the nodes of the preset primary cache queue corresponding to the second timestamp is deleted, thereby reducing a storage space occupied by the preset primary cache queue.

In the embodiment, the local clock of the audio playing device is updated through the device correction time sent by the master console, so that the local clock of the audio playing device is kept consistent with the master console, and a basis is provided for subsequent audio playing based on the unified timestamp. The preset primary cache queue is set according to the time auxiliary list sent by the master console, so that audio caching and audio extraction may be quickly carried out, thereby improving the speed of audio processing. Moreover, a length of each preset primary cache queue is limited through the preset time window, and after the audio data packets in the second nodes in the nodes of the preset primary cache queue corresponding to the second timestamp is performed with the audio analysis, the second nodes in the nodes of the preset primary cache queue corresponding to the second timestamp is deleted, so that the storage space occupied by the preset primary cache queue is reduced.

In the embodiment, the obtaining the audio data packets sent by the wireless communication modules of the audio playing device includes:

Step S121: if a communication type of each of the wireless communication modules is not WiFi, obtaining the audio data packets sent by a preset audio output device through the wireless communication modules.

Specifically, if the communication type of each of the wireless communication modules is not the WiFi, the audio data packets sent by the preset audio output device are obtained through the wireless communication modules, thereby directly obtaining the audio data packets from the audio output device based on the wireless communication technology other than the WiFi.

Step S122: if the communication type of each of the wireless communication modules is the WiFi, obtaining the audio data packets sent by a preset transit device through the wireless communication modules, where the preset transit device is located above the stage, and the preset transit device is configured to obtain the audio data packets sent by the preset audio output device.

Specifically, if the communication type of each of the wireless communication modules is the WiFi, the audio data packets sent by the preset transit device are obtained through the wireless communication modules, thereby obtaining the audio data packets sent by the preset transit device. Moreover, the preset transit device is located above the stage, thereby improving stability of a wireless communication connection of the preset transit device with each audio output device and each audio playing device.

Optionally, the preset transit device is configured to obtain the audio data packets sent by the audio output device based on a wireless communication connection and/or a wired communication connection.

The audio output device is configured to obtain the device correction time and the time auxiliary list sent by the master console, update a local clock of the audio playing device according to the device correction time, and perform data packet packaging on preset target audio data according to the time auxiliary list to obtain the audio data packets.

Specifically, according to the device correction time sent by the master console, the local clock of the audio output device is updated, so that the local clock of the audio output device is kept consistent with the master console, which provides a basis for subsequent audio playing based on the unified timestamp. The preset target audio data is performed with the data packet packaging according to each of the timestamps in the time auxiliary list, so as to generate the audio data packets according to the timestamps required by the master console.

In the embodiment, the preset transit device is located above the stage, thereby improving stability of a wireless communication connection of the preset transit device with each audio output device and each audio playing device. Moreover, according to the device correction time sent by the master console, the local clock of the audio output device is updated, so that the local clock of the audio output device is kept consistent with the master console, which provides the basis for the subsequent audio playing based on the unified timestamp. The preset target audio data is performed with the data packet packaging according to each of the timestamps in the time auxiliary list, so as to generate the audio data packets according to the timestamps required by the master console, thereby improving synchronism of audio playing of the stage and further improving the performance effect of the stage.

Figure 2:
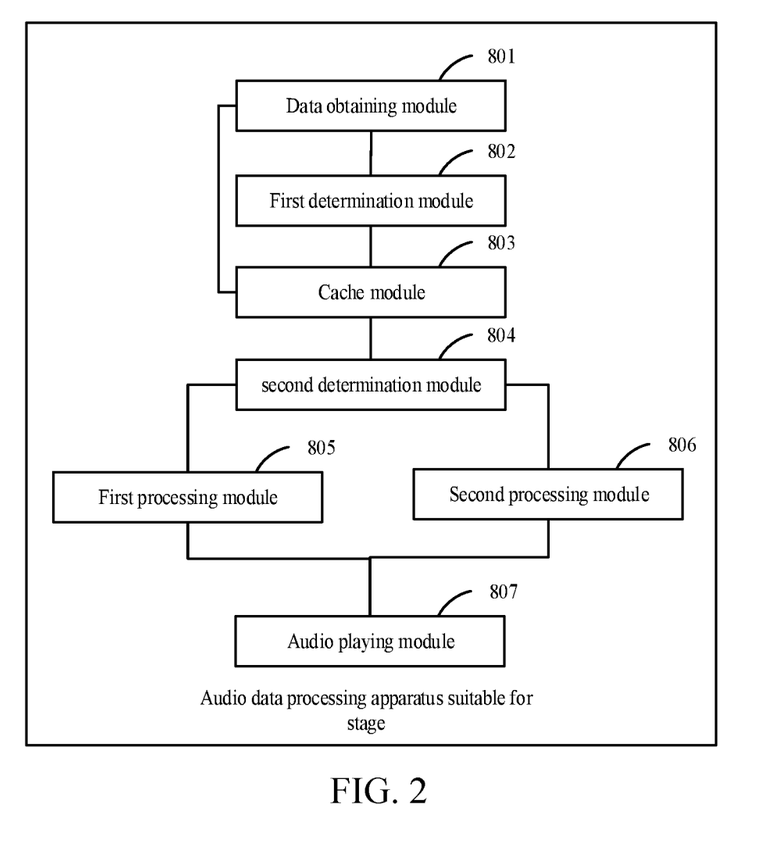
FIG. 2 is a structural block diagram of an audio data processing apparatus suitable for the stage according to one embodiment of the present disclosure.

As shown in FIG. 2, in one embodiment, the present disclosure provides an audio data processing apparatus suitable for a stage, applied to an audio playing device on the stage, including a data obtaining module 801, a first determination module 802, a cache module 803, a second determination module 804, a first processing module 805, a second processing module 806, and an audio playing module 807. The data obtaining module 801 is configured to obtain audio data packets sent by wireless communication modules of the audio playing device, and extract a first timestamp from audio data package names of the audio data packets. The first determination module 802 is configured to determine whether each of first package names corresponding to a preset primary cache queue includes the first timestamp. The cache module 803 is configured to insert the audio data packets into the preset primary cache queue if each of the first package names corresponding to the preset primary cache queue does not include the first timestamp, so as to sort each of the first package names corresponding to the preset primary cache queue in an ascending order according to timestamps, and the cache module 803 is further configured to not insert the audio data packets into the preset primary cache queue if each of the first package names corresponding to the preset primary cache queue includes the first timestamp. The second determination module 804 is configured to take an earliest value in the timestamps corresponding to each of the first package names corresponding to the preset primary cache queue as a second timestamp, subtract a preset delay extraction duration from current time to obtain a latest extraction time, and determine whether the second timestamp is later than the latest extraction time. The first processing module 805 is configured to, if the second timestamp is not later than the latest extraction time, extract a first audio data packet in the preset primary cache queue corresponding to the second timestamp, perform audio analysis on the first audio data packet to obtain an audio data segment, insert the audio data segment into a preset playing queue, and repeatedly take the earliest value in the timestamps corresponding to each of the first package names corresponding to the preset primary cache queue as the second timestamp until obtaining a preset process stopping signal. The second processing module 806 is configured to, if the second timestamp is later than the latest extraction time, repeatedly take the earliest value in the timestamps corresponding to each of the first package names corresponding to the preset primary cache queue as the second timestamp until obtaining the preset process stopping signal. The audio playing module 807 is configured to play audio according to the preset playing queue.

In the embodiment, according to the audio data processing method suitable for the stage of the present disclosure, the audio data packets sent by wireless communication modules of the audio playing device are obtained to achieve audio transmission using a plurality of wireless communication channels. Whether each of the first package names corresponding to the preset primary cache queue includes the first timestamp is determined, and the audio data packets are inserted into the preset primary cache queue if each of the first package names corresponding to the preset primary cache queue does not include the first timestamp, so as to sort each of the first package names corresponding to the preset primary cache queue in the ascending order according to the timestamps, and the audio data packets are not inserted into the preset primary cache queue if each of the first package names corresponding to the preset primary cache queue includes the first timestamp, thereby inserting a first arrived audio data packet of a plurality of the wireless communication modules into the preset primary cache queue, which combines transmission advantages of the plurality of the wireless communication modules, improves timeliness and stability of audio transmission, further reserves time for subsequent audio processing and playing, and improves audio playing quality. If the second timestamp is not later than the latest extraction time, the first audio data packet is extracted from the preset primary cache queue corresponding to the second timestamp to be performed with the audio analysis to obtain the audio data segment, and the audio data segment is inserted into the preset playing queue. By comparing the second timestamp with the latest extraction time, lack of audio data packets in partial timestamps is avoided as much as possible, thereby improving the audio playing quality. Moreover, the audio is played according to the preset playing queue, which improves fluency of audio playing and performance effect of the stage.

Figure 3:
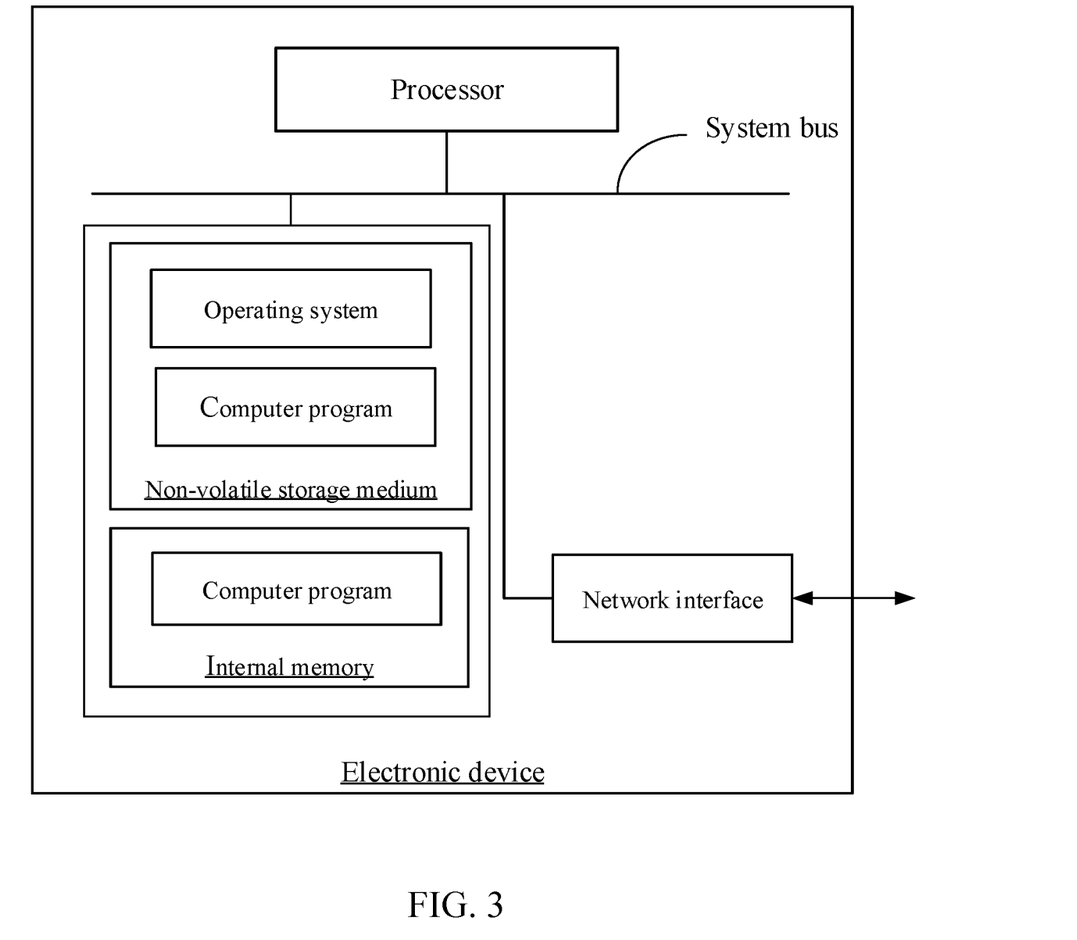
FIG. 3 is a structural block diagram of an electronic device according to one embodiment of the present disclosure.

FIG. 3 illustrates an internal structural block diagram of an electronic device according to one embodiment of the present disclosure. The electronic device may specifically be a terminal, or may be a server. As shown in FIG. 3, the electronic device includes a processor, a memory, and a network interface, where the processor, the memory, and the network interface are connected by a system bus. The memory includes a non-volatile storage medium and an internal memory. The non-volatile storage medium of the electronic device stores an operating system and may further store a computer program. When the computer program is executed by the processor, the processor may execute the audio data processing method suitable for the stage. The internal memory may also store a computer program, and when the computer program is executed by the processor, the processor may execute the audio data processing method suitable for the stage. It should be understood by those who skilled in the art that the structure shown in FIG. 3 is merely a block diagram of a partial structure related to the solution of the present disclosure, and does not constitute a limitation on the electronic device applied to the solution of the present disclosure, and a specific computer device may include more or fewer components than those shown in the figure, or a combination of some components, or have different component arrangements.

In one embodiment, the present disclosure provides an electronic device, including a memory and a processor. The memory stores a computer program, and the computer program is executed by the processor, causing the processor to execute an audio data processing method suitable for a stage, applied to an audio playing device on the stage, including following steps.

Obtaining audio data packets sent by wireless communication modules of the audio playing device, and extracting a first timestamp from audio data package names of the audio data packets.

Determining whether each of first package names corresponding to a preset primary cache queue includes the first timestamp.

Inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp.

Taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time.

If the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal.

If the second timestamp is later than the latest extraction time, repeatedly taking the earliest value in the timestamps corresponding to each of the first package names corresponding to the preset primary cache queue as the second timestamp until obtaining the preset process stopping signal.

Playing audio according to the preset playing queue.

In the embodiment, according to the audio data processing method suitable for the stage of the present disclosure, the audio data packets sent by wireless communication modules of the audio playing device are obtained to achieve audio transmission using a plurality of wireless communication channels. Whether each of the first package names corresponding to the preset primary cache queue includes the first timestamp is determined, and the audio data packets are inserted into the preset primary cache queue if each of the first package names corresponding to the preset primary cache queue does not include the first timestamp, so as to sort each of the first package names corresponding to the preset primary cache queue in the ascending order according to the timestamps, and the audio data packets are not inserted into the preset primary cache queue if each of the first package names corresponding to the preset primary cache queue includes the first timestamp, thereby inserting a first arrived audio data packet of a plurality of the wireless communication modules into the preset primary cache queue, which combines transmission advantages of the plurality of the wireless communication modules, improves timeliness and stability of audio transmission, further reserves time for subsequent audio data processing and playing, and improves audio playing quality. If the second timestamp is not later than the latest extraction time, the first audio data packet is extracted from the preset primary cache queue corresponding to the second timestamp to be performed with the audio analysis to obtain the audio data segment, and the audio data segment is inserted into the preset playing queue. By comparing the second timestamp with the latest extraction time, lack of audio data packets in partial timestamps is avoided as much as possible, thereby improving the audio playing quality. Moreover, the audio is played according to the preset playing queue, which improves fluency of audio playing and performance effect of the stage.

In one embodiment, the present disclosure further provides a computer readable storage medium having stored therein a computer program to be executed by a processor, causing the processor to execute an audio data processing method suitable for a stage, applied to an audio playing device on the stage, including following steps.

Obtaining audio data packets sent by wireless communication modules of the audio playing device, and extracting a first timestamp from audio data package names of the audio data packets.

Determining whether each of first package names corresponding to a preset primary cache queue includes the first timestamp.

Inserting the audio data packets into the preset primary cache queue if each of the first package names corresponding to the preset primary cache queue does not include the first timestamp, so as to sort each of the first package names corresponding to the preset primary cache queue in an ascending order according to timestamps; not inserting the audio data packets into the preset primary cache queue if each of the first package names corresponding to the preset primary cache queue includes the first timestamp.

Taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time.

If the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal.

If the second timestamp is later than the latest extraction time, repeatedly taking the earliest value in the timestamps corresponding to each of the first package names corresponding to the preset primary cache queue as the second timestamp until obtaining the preset process stopping signal.

Playing audio according to the preset playing queue.

In the embodiment, according to the audio data processing method suitable for the stage of the present disclosure, the audio data packets sent by wireless communication modules of the audio playing device are obtained to achieve audio transmission using a plurality of wireless communication channels. Whether each of the first package names corresponding to the preset primary cache queue includes the first timestamp is determined, and the audio data packets are inserted into the preset primary cache queue if each of the first package names corresponding to the preset primary cache queue does not include the first timestamp, so as to sort each of the first package names corresponding to the preset primary cache queue in the ascending order according to the timestamps, and the audio data packets are not inserted into the preset primary cache queue if each of the first package names corresponding to the preset primary cache queue includes the first timestamp, thereby inserting a first arrived audio data packet of a plurality of the wireless communication modules into the preset primary cache queue, which combines transmission advantages of the plurality of the wireless communication modules, improves timeliness and stability of audio transmission, further reserves time for subsequent audio processing and playing, and improves audio playing quality. If the second timestamp is not later than the latest extraction time, the first audio data packet is extracted from the preset primary cache queue corresponding to the second timestamp to be performed with the audio analysis to obtain the audio data segment, and the audio data segment is inserted into the preset playing queue. By comparing the second timestamp with the latest extraction time, lack of audio data packets in partial timestamps is avoided as much as possible, thereby improving the audio playing quality. Moreover, the audio is played according to the preset playing queue, which improves fluency of audio playing and performance effect of the stage.

Those who skilled in the art may understand that all or some of the processes in the method in the foregoing embodiment may be implemented by instructing related hardware by a computer program, the computer program may be stored in a non-volatile computer-readable storage medium, and when being executed, the computer program may execute steps of one embodiment of the foregoing method. Any reference to memory, storage, database, or other medium used in the embodiments provided in the present disclosure may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include random access memory (RAM) or external cache. By way of illustration, and not limitation, the RAM may be available in various forms, such as static RAM (SRAM), dynamic RAM (DRAM), synchronous DRAM (SDRAM), dual data rate SDRAM (DDRSDRAM), enhanced SDRAM (ESDRAM), Synchlink DRAM (SLDRAM), memory ram bus (RAMBUS) direct RAM (RDRAM), direct memory ram bus dynamic RAM (DRDRAM), memory ram bus dynamic RAM (RDRAM), etc.

Technical features of the above embodiments may be combined arbitrarily, so that the description is concise, and all possible combinations of the technical features in the foregoing embodiments are not described, however, as long as there is no contradiction in the combination of these technical features, it should be considered that the scope of the present specification is within the scope of the present specification.

The above embodiments only express several embodiments of the present disclosure, and the description thereof is more specific and detailed, but cannot be understood as a limitation on the patent scope of the present disclosure. It should be noted that, for those who skilled in the art, several variations and improvements may be made without departing from the concept of the present disclosure, which are all within the protection scopes of the present disclosure. Therefore, the protection scopes of the present disclosure shall be subject to the appended claims.

What is claimed is:

1. An audio data processing method suitable for a stage, applied to an audio playing device, comprising:
   obtaining audio data packets sent by wireless communication modules of the audio playing device, and extracting a first timestamp from audio data package names of the audio data packets;
   determining whether each of first package names corresponding to a preset primary cache queue comprises the first timestamp;
   inserting the audio data packets into the preset primary cache queue if each of the first package names corresponding to the preset primary cache queue does not comprise the first timestamp, so as to sort each of the first package names corresponding to the preset primary cache queue in an ascending order according to timestamps; not inserting the audio data packets into the preset primary cache queue if each of the first package names corresponding to the preset primary cache queue comprises the first timestamp;
   taking an earliest value in the timestamps corresponding to each of the first package names corresponding to the preset primary cache queue as a second timestamp; subtracting a preset delay extraction duration from current time to obtain a latest extraction time, and determining whether the second timestamp is later than the latest extraction time;
   if the second timestamp is not later than the latest extraction time, extracting a first audio data packet in the preset primary cache queue corresponding to the second timestamp, and performing audio analysis on the first audio data packet to obtain an audio data segment, inserting the audio data segment into a preset playing queue, and repeatedly taking the earliest value in the timestamps corresponding to each of the first package names corresponding to the preset primary cache queue as the second timestamp until obtaining a preset process stopping signal;
   if the second timestamp is later than the latest extraction time, repeatedly taking the earliest value in the timestamps corresponding to each of the first package names corresponding to the preset primary cache queue as the second timestamp until obtaining the preset process stopping signal; and
   playing audio by speakers of the audio playing devices, according to the preset playing queue.

2. The audio data processing method suitable for the stage according to claim 1, wherein the not inserting the audio data packets into the preset primary cache queue if each of the first package names corresponding to the preset primary cache queue comprises the first timestamp comprises:
   not inserting the audio data packets into the preset primary cache queue if each of the first package names corresponding to the preset primary cache queue comprises the first timestamp, and initializing a value of a preset counter to 1;
   obtaining auxiliary cache queues each having a number corresponding to the value of the preset counter as queues to be analyzed;
   determining whether each of second package names corresponding to the queues to be analyzed comprises the first timestamp;
   inserting the audio data packets into the queues to be analyzed if each of the second package names corresponding to the queues to be analyzed does not comprise the first timestamp, so as to sort each of the second package names corresponding to the queues to be analyzed in the ascending order according to the timestamps;

adding 1 to the value of the preset counter if each of the second package names corresponding to the queues to be analyzed comprises the first timestamp, and repeatedly obtaining the auxiliary cache queues each having the number corresponding to the value of the preset counter as the queues to be analyzed until obtaining the preset process stopping signal;

wherein the extracting the first audio data packet in the preset primary cache queue corresponding to the second timestamp and the performing the audio analysis on the first audio data packet comprise:

extracting the first audio data packet in the preset primary cache queue corresponding to the second timestamp as a first data packet; and confirming the audio data segment according to the first data packet and each of the auxiliary cache queues.

3. The audio data processing method suitable for the stage according to claim 2, wherein the confirming the audio data segment according to the first data packet and each of the auxiliary cache queues comprises:

extracting a second audio data packet in each of the auxiliary cache queues corresponding to the second timestamp as a second data packet;

extracting a third audio data packet having highest channel priority from each of the first data packet and the second data packet in each of the auxiliary cache queues as a data packet to be analyzed according to a preset channel priority configuration; and performing the audio analysis on the data packet to be analyzed to obtain the audio data segment.

4. The audio data processing method suitable for the stage according to claim 2, wherein the confirming the audio data segment according to the first data packet and each of the auxiliary cache queues further comprises:

performing the audio analysis on the first data packet to obtain a first data segment;

inputting the first data segment into a preset audio quality evaluation model for quality evaluation and calculation to serve as a first quality evaluation result;

determining whether the first quality evaluation result is within a preset quality evaluation range;

if the first quality evaluation result is within the preset quality evaluation range, taking the first data segment as the audio data segment;

if the first quality evaluation result is not within the preset quality evaluation range, extracting a fourth audio data packet in each of the auxiliary cache queues corresponding to the second timestamp as a third data packet;

performing the audio analysis on the third data packet to obtain a second data segment;

inputting the second data segment into the preset audio quality evaluation model for quality evaluation and calculation to serve as a second quality evaluation result;

extracting a quality evaluation result having highest quality from the first quality evaluation result and the second quality evaluation result as a target quality evaluation result; and performing the audio analysis on a fifth audio data packet corresponding to the target quality evaluation result to obtain the audio data segment.

5. The audio data processing method suitable for the stage according to claim 4, wherein the performing the audio analysis on the first data packet to obtain the first data segment comprises:

subtracting the second timestamp from the current time as a duration to be analyzed;

determining whether the duration to be analyzed is less than a preset duration threshold;

if the duration to be analyzed is less than the preset duration threshold, performing the audio analysis on the first data packet to obtain the first data segment; and if the duration to be analyzed is not less than the preset duration threshold, performing the audio analysis on the first data packet to obtain the audio data segment.

6. The audio data processing method suitable for the stage according to claim 1, wherein before the obtaining the audio data packets sent by the wireless communication modules of the audio playing device, the audio data processing method suitable for the stage comprises:

obtaining a device correction time and a time auxiliary list sent by a master console;

updating a local clock of the audio playing device according to the device correction time;

obtaining each of time points corresponding to a preset time window from the time auxiliary list based on a preset interval duration as a time point set;

setting nodes of the preset primary cache queue according to the time point set, where each of the nodes is configured to store one of the audio data packets;

wherein the inserting the audio data packets into the preset primary cache queue comprises:

inserting each of the audio data packets into each of first nodes in the nodes of the preset primary cache queue corresponding to the first timestamp;

wherein the extracting the first audio data packet in the preset primary cache queue corresponding to the second timestamp and the performing the audio analysis on the first audio data packet to obtain the audio data segment comprises:

performing the audio analysis on the first audio data packet in second nodes in the nodes of the preset primary cache queue corresponding to the second timestamp to obtain the audio data segment; and deleting the second nodes in the nodes of the preset primary cache queue corresponding to the second timestamp.

7. The audio data processing method suitable for the stage according to claim 6, wherein the obtaining the audio data packets sent by the wireless communication modules of the audio playing device comprises:

if a communication type of each of the wireless communication modules is not wireless fidelity (WiFi), obtaining the audio data packets sent by a preset audio output device through the wireless communication modules;

if the communication type of each of the wireless communication modules is the WiFi, obtaining the audio data packets sent by a preset transit device through the wireless communication modules;

wherein the preset transit device is located above the stage, and the preset transit device is configured to obtain the audio data packets sent by the preset audio output device;

wherein the audio output device is configured to obtain the device correction time and the time auxiliary list sent by the master console, update a local clock of the audio playing device according to the device correction time, and perform data packet packaging on preset target audio data according to the time auxiliary list to obtain the audio data packets.

8. A non-transitory computer readable storage medium having stored therein a computer program to be executed by a processor, causing the processor to execute:
the audio data processing method suitable for the stage according to claim 1.

9. An electronic device, comprising:
a memory; and
a processor;
wherein the memory stores a computer program, and the computer program is executed by the processor, causing the processor to execute the audio data processing method suitable for the stage according to claim 1.

* * * * *